(12) United States Patent
Lischinski et al.

(10) Patent No.: US 7,479,963 B2
(45) Date of Patent: Jan. 20, 2009

(54) METHOD AND SYSTEM FOR PERFORMING COMPUTER GRAPHIC SIMULATION OF A FLUID USING TARGET-DRIVEN CONTROL

(75) Inventors: Daniel Lischinski, Jerusalem (IL); Raanan Fattal, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 449 days.

(21) Appl. No.: 11/128,227

(22) Filed: May 13, 2005

(65) Prior Publication Data

US 2005/0253854 A1 Nov. 17, 2005

Related U.S. Application Data

(60) Provisional application No. 60/571,619, filed on May 14, 2004.

(51) Int. Cl.
*G06T 15/00* (2006.01)
(52) U.S. Cl. .................. 345/474; 345/473; 345/475; 703/2; 703/7
(58) Field of Classification Search ......... 345/473–475; 703/2, 7–9
See application file for complete search history.

(56) References Cited

U.S. PATENT DOCUMENTS

| 5,999,194 | A | 12/1999 | Brunelle ................... 345/473 |
| 6,266,071 | B1 | 7/2001 | Stam et al. ................. 345/473 |
| 6,959,269 | B1* | 10/2005 | Welterlen ...................... 703/8 |
| 7,184,051 | B1* | 2/2007 | Matsumoto et al. ......... 345/581 |
| 7,243,057 | B2* | 7/2007 | Houston et al. ................. 703/9 |

OTHER PUBLICATIONS

Chorin, A. J., "A Numerical Method for Solving Incompressible Viscous Flow Problems", Journal of Computational Physics, (1967), pp. 12-16, vol. 2.

Enright, D., et al., "Animation and Rendering of Complex Water Surfaces", ACM Transactions on Graphics (Proceedings of ACM SIGGRAPH Jul. 2002), pp. 736-744, vol. 21, No. 3.

Fedkiw, R., et al., "Visual Simulation of Smoke", In Computer Graphics Proceedings, Annual Conference Series, E. Fiume, Ed., ACM SIGGRAPH, (2001), pp. 15-22.

Foster, N., et al., "Controlling Fluid Animation", In Proceedings CGI '97, (1997), pp. 178-188.

(Continued)

*Primary Examiner*—Phu K Nguyen
(74) *Attorney, Agent, or Firm*—Browdy and Neimark, P.L.L.C.

(57) ABSTRACT

Method and system for efficiently controlling animated smoke which utilizes a sequence of target smoke states to generate a smoke simulation in which the smoke is driven towards each of these targets in turn, while exhibiting natural-looking interesting smoke-like behavior. This control is made possible by two new terms added to standard flow equations: (i) a driving force term that causes the fluid to carry the smoke towards a particular target, and (ii) a smoke gathering term that prevents the smoke from diffusing too much. These terms are explicitly defined by the instantaneous state of the system at each simulation time step. Thus, no expensive optimization is required, allowing complex smoke animations to be generated with very little additional cost compared to ordinary flow simulations. The invention is also applicable to animation of other fluid flow phenomena.

26 Claims, 5 Drawing Sheets

OTHER PUBLICATIONS

Foster, N., et al., "Practical Animation of Liquids", In Computer Graphics Proceedings, Annual Conference Series, E. Fiume, Ed., ACM SIGGRAPH, (2001), pp. 23-30.

Foster, N., et al., "Realistic Animation of Liquids", Graphical Models and Image Processing, (Sep. 1996), pp. 471-483, vol. 58, No. 5.

Harlow, F. H., et al., "Numerical Calculation of Time Dependent Viscous Incompressible Flow of Fluid with Free Surface", The Physics of Fluid, (Dec. 1965), pp. 2182-2189, vol. 8, No. 12.

Lamorlette, A., et al., "Structural Modeling of Flames for a Production Environment", ACM Transactions on Graphics (Proceedings of ACM SIGGRAPH Jul. 2002), pp. 729-735, vol. 21, No. 3.

Nguyen, D. Q., et al., "Physically Based Modeling and Animation of Fire", ACM Transactions on graphics (Proceedings of ACM SIGGRAPH Jul. 2002), pp. 721-728, vol. 21, No. 3.

Stam, J., "Stable Fluids", In Computer Graphics Proceedings, Annual Conference Series, A. Rockwood, Ed., ACM SIGGRAPH, (1999), pp. 121-128.

Treuille, A., et al., "Keyframe Control of Smoke Stimulations", ACM Transactions on Graphics (Proceedings of ACM SIGGRAPH Jul. 2003), pp. 716-723, vol. 22, No. 3.

Witting, P., "Computational Fluid Dynamics in a Traditional Animation Environment", In Computer Graphics Proceedings, Annual Conference Series, A. Rockwood E., ACM SIGGRAPH, (1999), pp. 129-136.

* cited by examiner

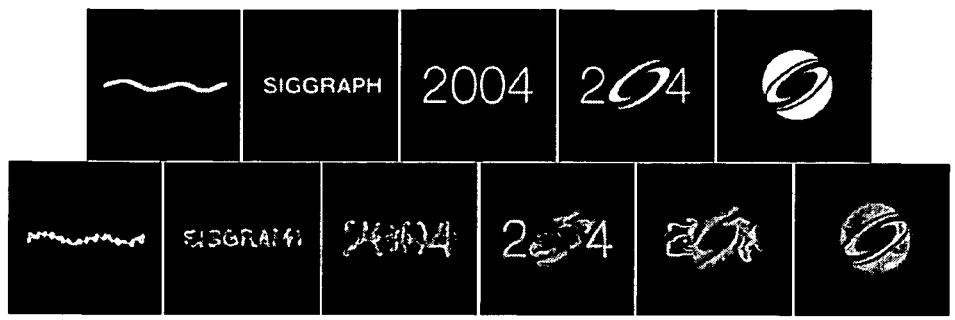
FIG. 4
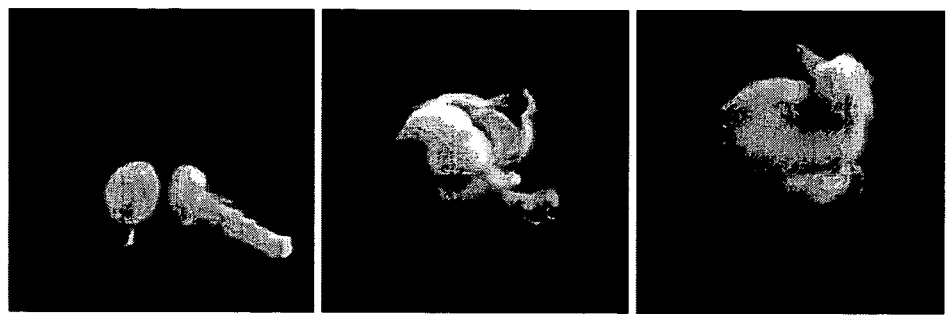
FIG. 5
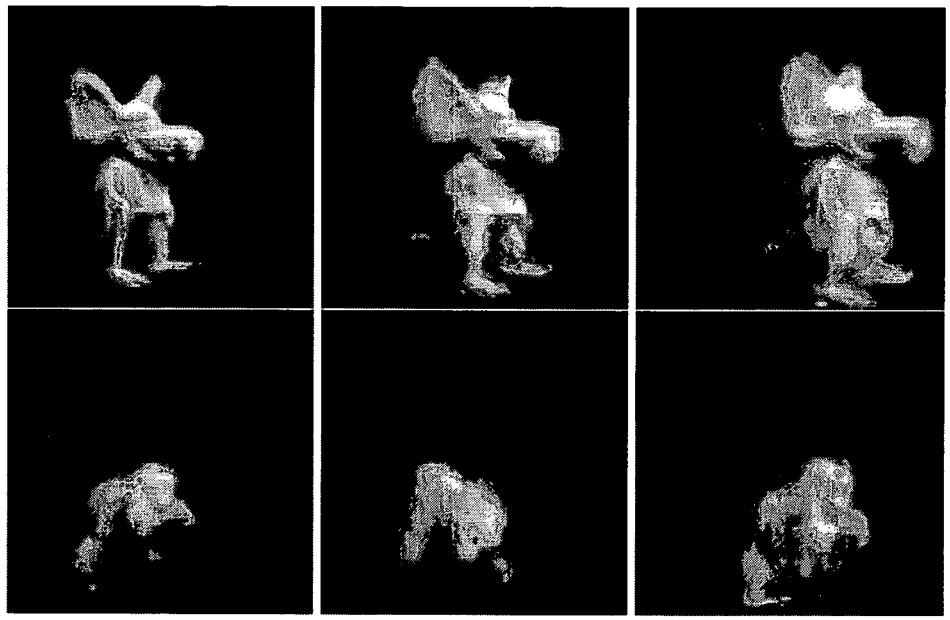
FIG. 6a
FIG. 6b

METHOD AND SYSTEM FOR PERFORMING COMPUTER GRAPHIC SIMULATION OF A FLUID USING TARGET-DRIVEN CONTROL

FIELD OF THE INVENTION

This invention relates generally to computer graphic animation, and more particularly to computer graphic simulation of fluid flow.

REFERENCES

The following non-patent references provide relevant background to the present invention and will be referenced in the discussion of prior art and description:

[1] CHORIN, A. J. 1967. A numerical method for solving incompressible viscous flow problems. *Journal of Computational Physics* 2, 12-16.

[2] ENRIGHT, D., MARSCHNER, S., AND FEDKIW, R. 2002. Animation and rendering of complex water surfaces. *ACM Transactions on Graphics (Proceedings of ACM SIGGRAPH 2002)* 21, 3 (July), 736-744.

[3] FEDKIW, R., STAM, J., AND JENSEN, H. W. 2001. Visual simulation of smoke. In *Computer Graphics Proceedings*, Annual Conference Series, E. Fiume, Ed., ACM SIGGRAPH, 15-22.

[4] FOSTER, N., AND FEDKIW, R. 2001. Practical animations of liquids. In *Computer Graphics Proceedings*, Annual Conference Series, E. Fiume, Ed., ACM SIGGRAPH, 23-30.

[5] FOSTER, N., AND METAXAS, D. 1996. Realistic animation of liquids. Graphical Models and Image Processing 58, 5 (September), 471-483.

[6] FOSTER, N., AND METAXAS, D. 1997. Controlling fluid animation. In Proceedings CGI '97, 178-188.

[7] HARLOW, F. H., AND WELCH, J. E. 1965. Numerical calculation of time-dependent viscous incompressible flow of fluid with free surface. *The Physics of Fluids* 8 (Dec.), 2182-2189.

[8] LAMORLETTE, A., AND FOSTER, N. 2002. Structural modeling of flames for a production environment. *ACM Transactions on Graphics (Proceedings of ACM SIGGRAPH 2002)* 21, 3 (July), 729-735.

[9] LEVEQUE, R. J. 2002. *Finite Volume Methods for Hyperbolic Problems.* Cambridge University Press.

[10] NGUYEN, D. Q., FEDKIW, R., AND JENSEN, H. W. 2002. Physically based modeling and animation of fire. *ACM Transactions on Graphics (Proceedings of ACM SIGGRAPH 2002)* 21, 3 (July), 721-728.

[11] PRESS, W. H., TEUKOLSKY, S. A., VETTERLING, W. T., AND FLANNERY, B. P. 1992. *Numerical Recipes in C: The Art of Scientific Computing,* 2nd ed. Cambridge University Press.

[12] STAM, J. 1999. Stable fluids. In *Computer Graphics Proceedings*, Annual Conference Series, A. Rockwood, Ed., ACM SIGGRAPH, 121-128.

[13] TREUILLE, A., MCNAMARA, A., POPOVIC, Z., AND STAM, J. 2003. Keyframe control of smoke simulations. *ACM Transactions on Graphics (Proceedings of ACM SIGGRAPH 2003)* 22, 3 (July), 716-723.

[14] TROTTENBERG, U., OOSTERLEE, C., AND SCHÜLLER, A. 2001. *Multigrid.* Academic Press.

[15] WITTING, P. 1999. Computational fluid dynamics in a traditional animation environment. In *Computer Graphics Proceedings*, Annual Conference Series, A. Rockwood, Ed., ACM SIGGRAPH, 129-136.

BACKGROUND OF THE INVENTION

Animated natural phenomena, such as smoke, fire, and liquids, have become an indispensable component in contemporary computer generated animation, special effects, training simulators, and computer games. Currently, realistic and believable animations of these elements are most effectively achieved through physically-based numerical simulations of fluid dynamics. Efficient and stable methods for performing such simulations have been recently introduced to the computer graphics community [12,3,4,2,10]. However, providing animators with means for controlling such animations in an intuitive yet precise manner remains a challenging open problem. The present invention addresses this problem by introducing a new tool for controlling animations of smoke.

To illustrate just how challenging smoke animation control can be, consider the shot from the recent feature film The Fellowship of the Ring, where the smoke that Gandalf blows forms a beautiful galleon that sails right through Bilbo's expanding smoke ring. It would have been extremely difficult, if not impossible, for an animator to achieve such detailed and precise smoke formations and motion by manually adjusting wind fields and other smoke simulation parameters.

Many researchers in the field of computer graphics have used physically-based models and computational fluid dynamics (CFD) to simulate fluid flows. The interested reader can find good surveys in the previous work sections of [12], [3], and [13]. Different mechanisms for controlling fluid flows are disclosed in [6], [8], [13] and [15].

Foster and Metaxas [6] describe a mechanism referred to as "embedded controllers" via which an animator may introduce various effects into fluid animations by adapting boundary and fluid properties, and pressure and velocity fields. Thus, animators need not understand the fluid dynamics equations, or the low-level details of the solver. However, they must understand the dynamics of the effect they are interested in achieving.

Witting [15] describes the CFD tool that was used at DreamWorks Feature Animation to produce smoke and fluid effects for the feature film The Prince of Egypt. DreamWorks is a trademark of DreamWorks Animation LLC, California, USA. With this tool animators drive fluid simulations by using images and animated sequences to specify inputs such as initial temperature fields, heat sources, and forcing functions. Another production tool that provides animators both artistic and behavioral control for animation of flames is described by Lamorlette and Foster [8]. However, neither of these tools supports direct control over the desired results.

In a recent pioneering work Treuille et al. [13] introduced a method for keyframe control of smoke simulations. They employ a shooting technique to solve for the optimal wind forces that would cause a smoke simulation to approximate a set of user-specified keyframes as closely as possible. An animator controls a smoke simulation by specifying smoke density keyframes. Continuous quasi-Newton optimization is then used to solve for the control forces that would cause the simulated smoke to approximate the keyframes while minimizing the amount of force. The control force field is defined by a collection of parametric wind and vortex forces, and the optimization process searches for the appropriate parameter values.

While this approach has produced some very impressive results, it suffers from several drawbacks. First, the optimization framework is very expensive, as it requires multiple evaluations of the objective function and of its gradient. Each evaluation performs an entire simulation and, in addition to computing the velocity and the smoke density, their derivatives with respect to each of the control parameters are computed as well. Furthermore, the dimensionality of the optimization problem grows with the length of the simulation, so it is necessary to split the original problem into several smaller optimization problems, organized in two overlapping schedules, and to alternate between them. The dimensionality and cost concerns also dictate using a small number of control forces and a relatively coarse grid, making it difficult to specify and match highly detailed keyframes.

U.S. Pat. No. 6,266,071 (Stam) entitled "Method of producing fluid-like animations using a rapid and stable solver for the Navier-Stokes equations" and published Jul. 24, 2001 discloses a method for performing computer graphic simulation of a fluid in motion. The method takes input data and calculates the velocity of the fluid at a plurality of points at successive time intervals. The velocity values are sent to an animator module which produces a geometrical description of the scene. This geometrical description is then sent to a renderer module, which calculates an image using the geometrical description. The animation is then displayed on an output device. Scalar quantities such as temperature and density may also be calculated and sent to the renderer module, where they are used in calculating the image.

U.S. Pat. No. 5,999,194 (Brunelle) entitled "Texture controlled and color synthesized animation process" and published Jul. 12, 1999 discloses a process for producing an animation having fluid color, texture and consistency throughout the entire sequence. The process comprises the steps of creating key frames containing objects and characters having substantial color and texture and which correspond to an animated sequence. The key frames are digitized into a computer system for storage in a memory space. Two consecutive key frames are then defined as a source key frame and a target key frame. Corresponding features in both the source key frame and the target key frame are then outlined and in-between frames are generated by linear interpolation of each outlined Fig. in the source key frame and a corresponding outline in the target key frame.

The contents of both the above-referenced patents are incorporated herein by reference.

It would be desirable to provide a method and system for generating fluid-based animations, which allows complex simulations or animations to be controlled with very little additional cost compared to hitherto-proposed simulations and which avoids the need for optimization as required by Treuille et al. [13].

SUMMARY OF THE INVENTION

It is an object of the invention to provide a method and system for generating fluid-based animations, which allows complex simulations or animations to be controlled with very little additional cost compared to hitherto-proposed simulations and which avoids the need for optimization.

This object is realized in accordance with a first aspect of the invention by method for performing computer graphic simulation of an incompressible fluid in motion, the method comprising:

providing to a simulator module input data that includes a scalar field that defines a physical property of the fluid or of matter suspended therein and a sequence of target scalar fields that define a desired temporal evolution of the scalar field;

simulating fluid motion by calculating a velocity vector u of the fluid at a plurality of points in the simulated fluid, at a plurality of time intervals, wherein said calculation is performed by solving an equation:

$$u_t = -u \cdot \nabla u - \nabla p + f$$

where:
p=hydrostatic pressure,
f=combination of forces acting on the fluid and includes a driving force F that propels the fluid in such a manner that the resulting flow carries the scalar field towards the next target scalar field in said sequence;
$u_t$=is the vector of time derivatives of the velocity field u;
using said velocity values at each time interval to advect the scalar field;

sending some or all of the scalar fields to a renderer module for producing a sequence of animation frames each relating to a respective scalar field; and storing the sequence of animation frames for subsequent display.

According to a second aspect of the invention there is provided a system for performing computer graphic simulation of an incompressible fluid in motion, the system comprising:

a simulator module having an input for receiving data that includes a scalar field that defines a physical property of the fluid or of matter suspended therein and a sequence of target scalar fields that define a desired temporal evolution of the scalar field;

said simulator module being adapted to calculate a velocity vector u of the fluid at a plurality of points in the simulated fluid, at a plurality of time intervals, wherein said calculation is performed by solving an equation:

$$u_t = -u \cdot \nabla u - \nabla p + f$$

where:
p hydrostatic pressure,
f=combination of forces acting on the fluid and includes a driving force F that propels the fluid in such a manner that the resulting flow carries the scalar field towards the next target scalar field in said sequence,
$u_t$=is the vector of time derivatives of the velocity field u;
an advection unit coupled to the simulator module for and being responsive to said velocity values at each time interval to advect the scalar field;

a renderer module coupled to the advection unit and being responsive to some or all of the scalar fields for producing a sequence of animation frames each relating to a respective scalar field; and a storage unit coupled to the renderer module for storing the sequence of animation frames for subsequent display.

The invention provides improved animation control of fluid-borne scalar fields, using target-driven animation as the control paradigm. A particular application of the invention relates to simulation of a suspension of smoke particles in air as is done by Treuille et al. [13]. However, rather than attempting to optimally approximate a set of keyframes as done by Treuille et al. [13], the invention controls the simulation by a sequence of target smoke states, each serving in turn as an attractor for the simulated smoke. This is achieved by augmenting the standard fluid dynamics equations with closed-form terms designed specifically to drive the simulation from any given state towards a user-specified smoke density target.

The control paradigm according to the invention does not guarantee that each target is approximated in an optimal manner before switching to the next one, but it eliminates the need for expensive non-linear optimization. The present invention does not require keeping track of derivatives, and may thus use non-differentiable numerical schemes, such as flux limiter based hyperbolic solvers [9], which improve simulation accuracy. Thus, complex and interesting smoke animations, such as the one shown in FIG. 1, are generated with very little additional cost compared to an ordinary smoke simulation.

Specifically, the invention provides: (i) a new driving force term in the momentum equation, designed to induce the fluid flow that will carry the current scalar field towards a user-specified scalar field target; (ii) a new gathering term in the scalar field advection equation, designed to counteract diffusion of the scalar field due to numerical dissipation, thereby improving the ability of the simulation to match arbitrary targets; (iii) the ability for animators to independently control several scalar fields sharing a fluid.

It should be noted that the target-driven approach according to the invention does not provide direct control over the quality with which targets are matched. Instead, the animator is provided with several intuitive parameters for controlling the rate at which smoke evolves, as well as other characteristics of the simulation.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 4 is a pictorial representation showing five targets in the top row and six animated frames in the bottom row generated using these targets;

FIG. 5 shows pictorially an animation of the Stanford bunny formed by smoke emitted from two smoke sources that generate smoke during the first half of the animation;

FIGS. 6a and 6b show different animation sequences defined by a dense sequence of similar targets where an animated 3D object is voxelized and the resulting volumes are used to drive a smoke animation;

DETAILED DESCRIPTION OF EXEMPLARY EMBODIMENTS

Figure 1:
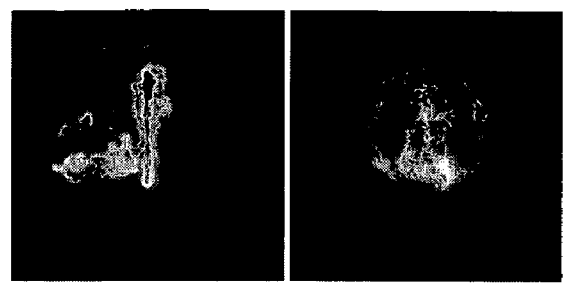
FIG. 1 is a pictorial representation of an animated smoke sequence produced using the invention.

The principles of the invention will now be described with regard to smoke simulation. It will be understood that smoke simulation requires the application of fluid dynamics to the flow of air in which there are suspended particles of smoke (carbon). However, it will be understood that the same principles are equally applicable to the suspension of other particles (e.g., dust, pigment) in air or other fluid carriers such as, for example, the flow of pigments through liquids. They are likewise applicable to the flow of temperature through a fluid and can be extended to model the propagation of heat and matter through the fluid, in addition to changes in velocity.

Problem Statement

Let us denote by $\rho=\rho(x,t)$ the time-dependent scalar field that specifies the density of smoke at location x and time t. Given an initial smoke density, $\rho_0=\rho(x, 0)$, and a sequence of target densities $\rho_i^*=\rho^*(x,t_i)$, our goal is to produce an animation in which the smoke is driven towards each of these targets in turn, while maintaining smoke-like dynamics and appearance. More specifically, during each time interval $(t_{i-1},t_i)$ the smoke should evolve towards the target $\rho_i^*$. Note that unlike in traditional keyframe animation our problem statement does not require the i-th target to be matched precisely at time $t_i$, but rather that at time $t_i$ the i-th target ceases to attract the smoke and $\rho_{i+1}^*$ becomes the attractor instead.

The Equations of Flow

Realistic smoke animations are typically generated by numerically approximating either the Navier-Stokes or the Euler equations. The Navier-Stokes equations contain a viscosity term, not present in the inviscid Euler equations. These equations govern the mechanics of a medium fluid (thin air) in which smoke is present. Denoting the fluid velocity vector field by $u=u(x, t)$ and its temporal derivative by $u_t$, the inviscid Euler equations for incompressible flow are:

$$u_t = -u \cdot \nabla u - \nabla p + f \quad (1)$$

$$\nabla \cdot u = 0 \quad (2)$$

where $p=p(x,t)$ is the hydrostatic pressure and f accounts for external forces affecting fluid flow, such as gravity and buoyancy. The term f may also account for other forces that are not strictly external such as viscosity, which as noted above is used by the Navier-Stokes equations. Therefore, for the purpose of the description and claims no distinction will be made whether the forces affecting fluid flow and encompassed by the force term f are external or intrinsic, thus allowing the Navier-Stokes and the Euler equations to be represented identically. By doing so, it will be readily understood that the invention may be applied to different fluid flow equations. Equation 1 is the balance of momentum equation (Newton's second law) for a fluid with unit density. Equation 2 is the continuity equation, which enforces conservation of mass. An additional equation describes the transport of smoke by the fluid flow (advection):

$$\rho_t = -u \cdot \nabla \rho \quad (3)$$

Here $\rho_t$ is the temporal derivative of the smoke density field $\rho$.

The force term f in equation 1 provides an important means of control over the smoke simulation. For example, Stam [12] used this term to allow a user to control the flow by dragging a mouse. Treuille et al. [13] include in this term a set of parameterized wind and vortex forces. Their optimization process then searches for parameter values that cause the simulation to match the specified keyframes. Thus, in their approach f implicitly depends on the initial smoke density $\rho_0$ and the target density $\rho^*$. The approach according to the invention also utilizes the force term in order to drive the simulation from a given initial state to a target state, but this is achieved by introducing a driving force term that depends only on the instantaneous state of the system, rather than being defined by some global optimization condition; it is an explicit yet simple function $F(\rho,\rho^*)$.

Equations of Flow as Modified According to the Invention

In accordance with the invention, two modifications are made to the fluid flow equations presented above. First, as already mentioned, the force term f in equation 1 includes a driving force $F(\rho,\rho^*)$ and a momentum attenuation term $-v_d u$ is added:

$$u_t = -u \cdot \nabla u - \nabla p + f^* + v_f F(\rho,\rho^*) - v_d u \qquad (4)$$

In the above equation, the force vector f is replaced by a modified force vector f*, equivalent to the force vector f in equation 1, but without the driving force term $F(\rho,\rho^*)$ which is now shown discretely. The additional force vector F is referred to as the driving force term, since it is designed to exert forces on the fluid in such a manner that the resulting flow will carry the smoke to the prespecified target density $\rho^*$. This term is derived below. The momentum attenuation term is added as a means for limiting the accumulation of momentum in the system.

Second, we add a smoke gathering term $G(\rho,\rho^*)$ to equation 3:

$$\rho_t = -u \cdot \nabla \rho + v_g G(\rho,\rho^*) \qquad (5)$$

The purpose of this term is to counteract numerical dissipation that causes smoke to diffuse. It enables our simulations to closely approximate a target density field, even if it is "sharper" than the initial density field. The gathering term is derived below.

These new terms are controlled by the non-negative parameters $v_f$, $v_d$, and $v_g$, whose effect is discussed below.

The Driving Force

In this section we develop an appropriate expression for the driving force term F. Recall that the purpose of this force, at any given time t, is to cause the fluid to advect the current smoke density $\rho(x,t)$ towards the next target $\rho^*(x)$. Furthermore, we must also take care to define F in a manner that enables the fluid to reach a rest state, $u=u_t=0$, once the target has been reached. Failure to enforce this requirement will cause undesirable fluctuations even in regions where $\rho=\rho^*$.

The rest state requirement may be satisfied by ensuring that the amount of momentum generated by F decreases as p approaches $\rho^*$, allowing the momentum attenuation term to bring the system to $u=u_t=0$ when $\rho=\rho^*$. In this state, equation 4 reduces to:

$$F(\rho^*,\rho^*) = \nabla p.$$

This means that rather than forcing F to vanish, we can simply allow the hydrostatic pressure to cancel it out. Thus, it suffices to ensure that $F(\rho^*,\rho^*)$ is a gradient of some potential field, rather than an arbitrary vector field.

Note that the gradient of the target density $\nabla \rho^*$ always points uphill towards higher concentrations of $\rho^*$. This means that the gradient is the desired direction of flow, and to induce it we align the driving force at any point x with $\nabla \rho^*(x)$:

$$F(\rho,\rho^*) \propto \nabla \rho^*$$

In practice, however, $\rho^*$ may be constant in some regions of the domain, causing $\nabla \rho^* = 0$ there. In order to avoid this problem we use a blurred version of $\rho^*$, which we denote $\tilde{\rho}^*$. In order to ensure that $\nabla \tilde{\rho}^* \neq 0$ everywhere, the blurring filter must have sufficiently large support. The filter should also fall off rapidly in order to avoid unnecessarily smoothing the directions of the gradients. In our implementation we obtain $\tilde{\rho}^*$ by convolving $\rho^*$ with a Gaussian kernel given by:

$$g(x) = e^{-x \cdot x/\sigma^2} \qquad (6)$$

with a small value for $\sigma$. Although the gradient $\nabla \tilde{\rho}^*$ is non-zero everywhere, its magnitude is very small away from regions where the target is defined, because of the rapid falloff of the blurring filter. Therefore, we use a "normalized" gradient instead:

$$F(\rho,\rho^*) \propto \frac{\nabla \tilde{\rho}^*}{\tilde{\rho}^*}.$$

Note that we are guaranteed that $\tilde{\rho}^* > 0$, since it is obtained by convolving the non-negative function $\rho^*$ with a Gaussian. As we shall see shortly, this form of normalization enables the driving force to comply with the rest state requirement.

In order to avoid applying forces unnecessarily, the magnitude of the driving force should be roughly proportional to the actual smoke density $\rho$. This could have been achieved by setting $$F(\rho,\rho^*) = \rho \frac{\nabla \tilde{\rho}^*}{\tilde{\rho}^*},$$

However, this expression does not comply with the rest state requirement. In order to fix this it suffices to replace $\rho$ with its blurred version $\tilde{\rho}$:

$$F(\rho,\rho^*) = \tilde{\rho} \frac{\nabla \tilde{\rho}^*}{\tilde{\rho}^*}. \qquad (7)$$

Note that for $\rho=\rho^*$ this definition gives us:

$$F(\rho^*,\rho^*) = \tilde{\rho}^* \frac{\nabla \tilde{\rho}^*}{\tilde{\rho}^*} = \nabla \tilde{\rho}^*,$$

and thus $F(\rho^*,\rho^*)$ is indeed a gradient of a potential field.

Smoke Gathering

In general, it is not possible to match a given target density field solely by advection. Consider, for example, a case where the target field $\rho^*$ contains higher values and higher gradients than those present in the initial field $\rho_0$. In the course of a simulation these initial values and gradients only decrease because of numerical dissipation, and therefore will never achieve the target values. Even if we were to somehow avoid numerical dissipation, it would still be impossible to match such a target: from the mathematical standpoint, due to incompressibility of the fluid, any advection applied to $\rho_0$ is merely a spatial remapping of this density distribution, incapable of generating any new density values. Tackling this issue by introducing an inverse diffusion operator, such as $-\alpha \nabla^2 \rho$, is physically unstable [11]. Instead, we introduce an alternative mechanism, which we refer to as smoke gathering. This mechanism is enforced by the $G(\rho,\rho^*)$ term in equation 5.

Let us assume that the total mass of the simulated smoke (the integral of ρ over the entire domain) is equal to that of the target smoke. In practice, this assumption can be realized by scaling the source or the target to make sure that the two masses are equal to each other. Now consider the time varying "density error" field $e(x,t)=\rho(x,t)-\rho^*(x)$. Obviously, any large differences in the values and/or gradients between ρ and $\rho^*$ give rise to high values and high gradients in e. The essence of our idea is to apply diffusion to e gradually smoothing it as time goes by. This is a stable process that will eventually make e constant across the entire domain, which implies $\rho=\rho^*$, because of mass conservation.

Formally, we would like the density error e to satisfy the following diffusion equation:

$$e_t = \nabla^2 e \quad (8)$$

with the von Neumann boundary conditions $$\frac{\partial e}{\partial n} = 0,$$

which essentially state that the equation must be resolved inside the domain, as no flux of e across the boundary is allowed. As time advances, e becomes zero across the domain, which implies that $$e=\rho-\rho^*=0 \text{ and } \nabla e = \nabla\rho - \nabla\rho^* = 0.$$

Thus, diffusing the error enables ρ to evolve exactly into $\rho^*$, given enough time.

Substituting the definition of e into equation 8 and noting that $\rho^*$ is constant with respect to time, we obtain the following equation in ρ:

$$\rho_t = \nabla^2(\rho-\rho^*). \quad (9)$$

Thus, in order to achieve diffusion of the error, we could simply set $G(\rho,\rho^*)=\nabla^2(\rho-\rho^*)$ in equation 5. In practice, however, we'd like the gathering effect to occur only in the close vicinity of the target $\rho^*$, otherwise we end up simply diffusing ρ:

$$\rho_t = \nabla^2(\rho-\rho^*) \approx \nabla^2 \rho.$$

In addition, gathering should only be allowed to occur where some smoke ρ is actually present, otherwise we might obtain negative values of ρ. To account for these requirements we rewrite equation 9 as:

$$\rho_t = \nabla \cdot \nabla(\rho-\rho^*).$$

where $\nabla(\rho-\rho^*)$ is the error flux, and modulate the error flux by both $\rho^*$ and ρ. Thus, our gathering term becomes $$G(\rho,\rho^*)=\nabla \cdot [\rho\rho^* \nabla(\rho-\rho^*)]. \quad (10)$$

Figure 2:
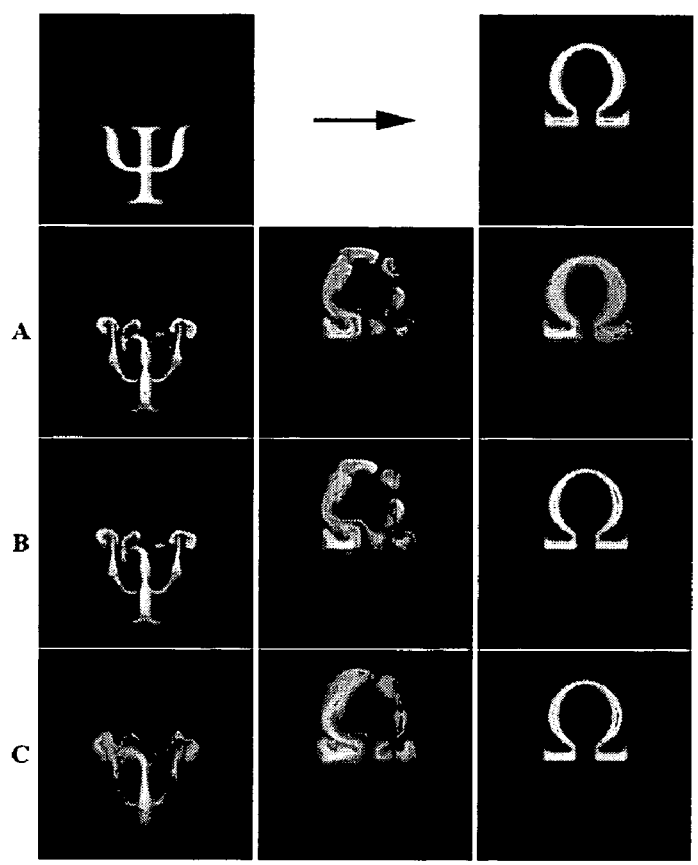
FIG. 2 shows frames from a simple animation sequence computed with and without a gathering term (rows B and A, respectively) in the fluid flow equations.

FIG. 2 shows frames from a simple animation sequence computed with and without the gathering term (rows B and A, respectively). The top row shows the initial density $\rho_0$ on the left and the target density $\rho^*$ on the right. Each of the next three rows shows three frames from a resulting simulation. Note that without the gathering term the simulation fails to converge to its target. By enabling the gathering only in the vicinity of the target, no diffusion is introduced in the early stages of the simulation. Turning gathering on enables the simulation to converge (row B). Row C was generated using a first order hyperbolic solver. The resulting frames are blurrier and contain less detail than those in row B, which were generated using a second order solver.

Multiple Field Flow

Our driving force term attracts any smoke present in the system towards the nearest "peak" of the target density. To provide the animator with more precise control over the affinity between the smoke and the target it is sometimes useful to split the smoke in the system to a number of independent density fields, each with its own set of initial and target states. Although each smoke field is controlled independently, there is an implicit interaction between them, as they are advected by, and exert driving forces on, the same fluid. Given n smoke fields $\rho^1,\ldots,\rho^n$ and their corresponding targets $\rho^{*,1},\ldots,\rho^{*,n}$ the only change in equation 4 is that the driving force is now the sum of the n driving forces $F(\rho^i,\rho^*,i)$ and we now have n advection equations for the smoke fields, instead of one:

$$\rho_t^i = -u \cdot \nabla \rho^i + v_g G(\rho^i,\rho^{*,i})$$

Note, however, that there is still only one velocity field u.

Control Parameters

The simulations produced by our methods are controlled via four parameters: the force smoothing parameter σ (eq. 6), the force coefficient $v_f$, the momentum attenuation coefficient $v_d$ (eq. 4), and the gathering coefficient $v_g$ (eq. 10):

σ—Increasing the value of this parameter results in a smoother driving force, inducing more moderate flows. Smoke is advected towards its target in a more organized manner, with less distortion and splitting along the way. On the other hand, increasing σ makes it more difficult for the flow to cause ρ to form the finer features of $\rho^*$. Decreasing σ creates more turbulent flows and a more chaotic smoke evolution.

$v_f$—This parameter allows the animator to boost or weaken the driving force, thus affecting the speed at which the simulation progresses towards the current target state $v_d$—This parameter determines the rate of momentum attenuation. Increasing it results in a more controlled, viscous-like flow, making it less likely for smoke to gain too much momentum and overshoot its target.

$v_g$—This parameter determines the rate at which ρ is gathered towards $\rho^*$. Increasing it reduces the amount of "stray" smoke in the simulation. On the other hand, setting the gathering rate too high makes the convergence of ρ to $\rho^*$ appear less natural, as discussed below.

Numerical Simulation

Given an initial velocity field $u^0$, initial smoke density $\rho_0$, and a target smoke density $\rho^*$ we simulate the fluid flow and the resulting motion of smoke by numerically solving equations 2, 4, and 5 over a series of discrete time steps.

Equations 4 and 5 express the rate of change of u and ρ as a sum of terms, each representing a different contribution. Such equations are often solved by the method of fractional steps, also known as operator splitting [11]. The same approach is used by Stam [12] and by Fedkiw et al. [3]. The main idea behind this method is to solve the original equation by integrating a succession of simpler equations, each with a single term on its right hand side. Each of the simpler equations can be treated more effectively by choosing the most appropriate method for integrating it. Specifically, we perform the following sequence of fractional steps in each time step:

1. Apply driving forces: $u_t = v_f F(\rho,\rho^*)$
2. Attenuate momentum: $u_t = -v_d u$
3. Advect momentum: $u_t = -u \cdot \nabla u$ 4. Project: solve for the pressure field p given by the Poisson equation $\nabla^2 p = \nabla \cdot u$ and subtract $\nabla p$ from u.
5. Advect smoke: $\rho_t = -u \cdot \nabla \rho$
6. Gather smoke: $\rho_t = v_g G(\rho, \rho^*)$.

In our implementation, steps 3, 5 and 6 are restricted by a CFL condition resulting from the explicit hyperbolic scheme used at these steps (described in appendix A). Formally, step 2 imposes another restriction on the maximal time step to be less than $1/v_d$. In practice, this is not a limitation as the typical values of $v_d$ are quite small.

The Computational Grid

Variables on the computational grid (in 2D).

Figure 3:
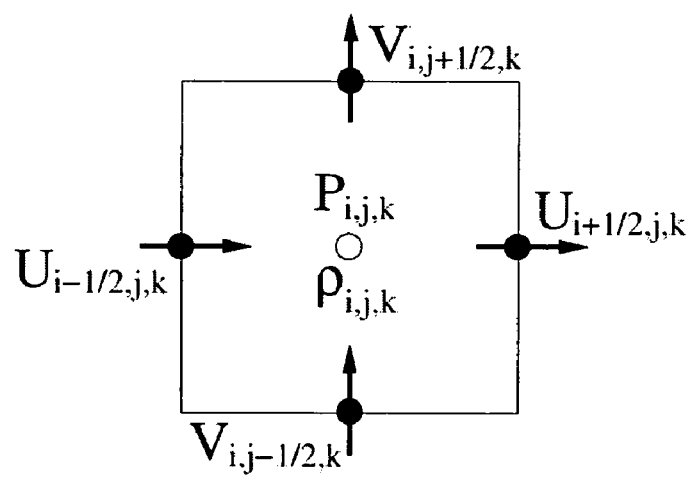
FIG. 3 shows schematically a 3D grid used to solve the fluid flow equations numerically using finite differences.

We use a regular 3D grid to solve our equations numerically using finite differences. We use a staggered arrangement of the different variables [7]: the velocity variables are defined at the centers of the cell faces, while the pressure and density variables are defined at the center of each cell (see FIG. 3). Such an arrangement avoids the infamous checkerboard instability [14], and it has also been used in previous fluid simulators in computer graphics [5,3]. We use the halfway index notation to distinguish between the different variable locations: for example, the variables for velocity components along the x, y, and z axes are denoted $$U_{i\pm\frac{1}{2},j,k},\ V_{i,j\pm\frac{1}{2},k},$$

and $$W_{i,j,k\pm\frac{1}{2}},$$

respectively, while the density variables are denoted $\rho_{i,j,k}$. Thus, $$U_{i+\frac{1}{2},j,k}$$

is located at $((i+\frac{1}{2})\Delta x, j\Delta y, k\Delta z)$, where $\Delta x$, $\Delta y$, and $\Delta z$ are the cell spacings along the x, y, and z axes, respectively. When necessary, we denote the number of the fractional step using a parenthesized superscript.

Discrete Operators

For compactness and readability we introduce notation for several discrete operators. First derivatives are approximated halfway between the positions of the corresponding variable. For example, the first derivative of the velocity along the x axis is approximated as $$D_x(U)_{i,j,k} = \frac{1}{\Delta x}\left(U_{i+\frac{1}{2},j,k} - U_{i-\frac{1}{2},j,k}\right)$$

and the first derivative of the density along the y axis is $$D_y(\rho)_{i,j+\frac{1}{2},k} = \frac{1}{\Delta y}(\rho_{i,j+1,k} - \rho_{i,j,k}).$$

Second derivatives are approximated at the positions where the variables are defined. For example, $$D_{zz}(W)_{i,j,k+\frac{1}{2}} = \frac{1}{\Delta z^2}\left(W_{i,j,k+\frac{3}{2}} - 2W_{i,j,k+\frac{1}{2}} + W_{i,j,k-\frac{1}{2}}\right)$$

is the second derivative of the velocity along the z axis.

Occasionally, we require the value of a field halfway between the locations where its variables are defined. In such cases, we approximate the value by using simple averaging. For example, $$A(V)_{i,j,k} = \frac{1}{2}\left(V_{i,j+\frac{1}{2},k} + V_{i,j-\frac{1}{2},k}\right)$$

is the velocity along the y axis at the center of a cell.

Applying the Driving Force

Components of the driving force must be evaluated for each updated velocity variable at its corresponding location. We denote these components $$F^u_{i\pm\frac{1}{2},j,k},\ F^v_{i,j\pm\frac{1}{2},k},$$

and $$F^w_{i,j,k\pm\frac{1}{2}}.$$

Each of these components is evaluated by approximating equation 7 at the corresponding grid point, using a discrete derivative operator and averaging:

$$F^u_{i+\frac{1}{2},j,k} = A(\tilde{\rho})_{i+\frac{1}{2},j,k} \frac{D_x(\tilde{\rho}^*)_{i+\frac{1}{2},j,k}}{A(\tilde{\rho}^*)_{i+\frac{1}{2},j,k}}$$

and similarly for $F^v$ and $F^w$. The velocity variables are then updated as follows:

$$U^{(l)}_{i+\frac{1}{2},j,k} = U^{(0)}_{i+\frac{1}{2},j,k} + \Delta t v_f F^u_{i+\frac{1}{2},j,k}$$

Note that when $\rho = \rho^*$, the driving force is "projected out" by the projection step in the discrete sense, allowing the discrete velocity variables to be at rest. This is due to the fact that in this case the discrete force components reduce to $$F^u_{i+\frac{1}{2},j,k} = D_x(\tilde{p}^*)_{i+\frac{1}{2},j,k}$$

that is, the gradient of a discrete potential function, which is exactly what is being eliminated by the projection step.

Advection and Gathering Terms

The advection term appearing in fractional steps 2 and 5 can be written in conservation form $$q_t = -u \cdot \nabla q = -(uq)_x - (vq)_y - (wq)_z$$

where q stands for either u or ρ. We solve this equation as three separate 1D hyperbolic equations $$q_t = -(uq)_x$$

$$q_t = -(vq)_y$$

$$q_t = -(wq)_z$$

using the high resolution hyperbolic solver described in Appendix A. This is a second-order numerical scheme that is considerably less prone to numerical dissipation compared to first-order schemes. Thus, for a given grid resolution more turbulent flows are obtained, and the fine features of the evolving smoke are better preserved. These advantages are demonstrated in FIG. 2, where row C shows the result of first order upwinding, compared to the second order scheme in row B.

The gathering term defined by equation 10 is already given in conservation form, and is also solved by the same solver, independently for each axis:

$$\rho_t = [\rho \rho^* (\rho - \rho^*)_x]_x$$

$$\rho_t = [\rho \rho^* (\rho - \rho^*)_y]_y$$

$$\rho_t = [\rho \rho^* (\rho - \rho^*)_z]_z$$

Projection

The discrete velocity field $(U,V,W)^{(3)}$ after fractional step 3, is not divergence free. To impose equation 2 discretely, we use Chorin's projection technique [1]. We recover a divergence free field $(U,V,W)^{(4)}$ in the discrete sense, i.e.

$$(D_x(U^{(4)}) + D_y(V^{(4)}) + D_z(W^{(4)}))_{i,j,k} = 0,$$

by subtracting the gradient of the pressure field P:

$$U^{(4)}_{i+\frac{1}{2},j,k} = U^{(3)}_{i+\frac{1}{2},j,k} - D_x(P)_{i+\frac{1}{2},j,k}$$

$$V^{(4)}_{i,j+\frac{1}{2},k} = V^{(3)}_{i,j+\frac{1}{2},k} - D_y(P)_{i,j+\frac{1}{2},k}$$

$$W^{(4)}_{i,j,k+\frac{1}{2}} = W^{(3)}_{i,j,k+\frac{1}{2}} - D_z(P)_{i,j,k+\frac{1}{2}}$$

Combining the above equations, we get the following set of equations for the pressure variables $P_{i,j,k}$ $$(D_{xx}(P) + D_{yy}(P) + D_{zz}(P))_{i,j,k} = (D_x(U^{(3)}) + D_y(V^{(3)}) + D_z(W^{(3)}))_{i,j,k} \quad (11)$$

which is a discretization of the Poisson equation $\nabla^2 p = \nabla \cdot u$. This is a large sparse set of linear equations, which we solve using a standard multigrid solver [14].

The values of the velocity variables on the boundary are prescribed by the boundary conditions, so there we have $(U,V,W)^{(4)} = (U,V,W)^{(3)}$. Consequently, for the left boundary cells, equation 11 reads:

$$\frac{1}{\Delta x^2}(P_{1,j,k} - P_{0,j,k}) + D_{yy}(P)_{0,j,k} + D_{zz}(P)_{0,j,k} =$$

$$\frac{1}{\Delta x}\left(U^{(3)}_{\frac{1}{2},j,k} - U^{(3)}_{-\frac{1}{2},j,k}\right) + D_y(V^{(3)})_{0,j,k} + D_z(W^{(3)})_{0,j,k}.$$

This is also the case for all the other boundaries.

The invention has been implemented in 2D and in 3D using the C++ programming language. All of the timings reported below were measured on a 2.4 GHz Pentium IV with 1 GB of RAM running Linux. For 2D simulations on a $256^2$ grid a single time step takes 0.25 seconds. For 3D simulations on a $128^3$ grid each time step takes 10.6 seconds. This is only about 15 percent slower than the computation time for an ordinary smoke simulation (without our driving force and gathering terms) using the same implementation.

In all of the following examples between 5 and 15 adaptive timesteps were used for each animation frame, so each second of a 20 fps animation took about 50 seconds of simulation time in 2D, and about 35 minutes in 3D. This is faster by at least two orders of magnitude than the running times in [13], where they report that it took 2-5 hours to optimize a 50×50 2D simulation.

The invention has been applied to two different kinds of smoke animations. The first uses target states that are very different from each other, in essence producing a morphing sequence between pairs of states. Examples are shown in FIGS. 4 and 5.

FIG. 4 shows several frames from a transforming 2D logo sequence. Despite the very different and complex target states our method manages to approximate the targets quite well, while maintaining fluid-like behavior. Note that the entire simulation was performed on a single grid without any spatial or temporal splitting, enabling interesting global interactions: the smoke starts out as a single body, then splits to form separate letters, which later join again to form the final logo.

FIG. 5 is an example where rather than morphing between two targets we specify a single target and two smoke sources that generate smoke during the first half of the animation. The driving force is very effective at directing the two turbulent smoke streams from the sources to accurately form the shape of the Stanford bunny.

Another kind of smoke animation is that defined by a dense sequence of similar targets. The idea is to voxelize an animated 3D object and use the resulting volumes to drive a smoke animation. Frames from two such animations are shown in FIGS. 6a and 6b, respectively. Here the overall motion is dictated by the targets, and the characters are still quite recognizable, but they exhibit interesting smoke-like dynamics. The gathering term is instrumental here, as it enables the smoke to track the moving character for as long as needed.

Figure 7:
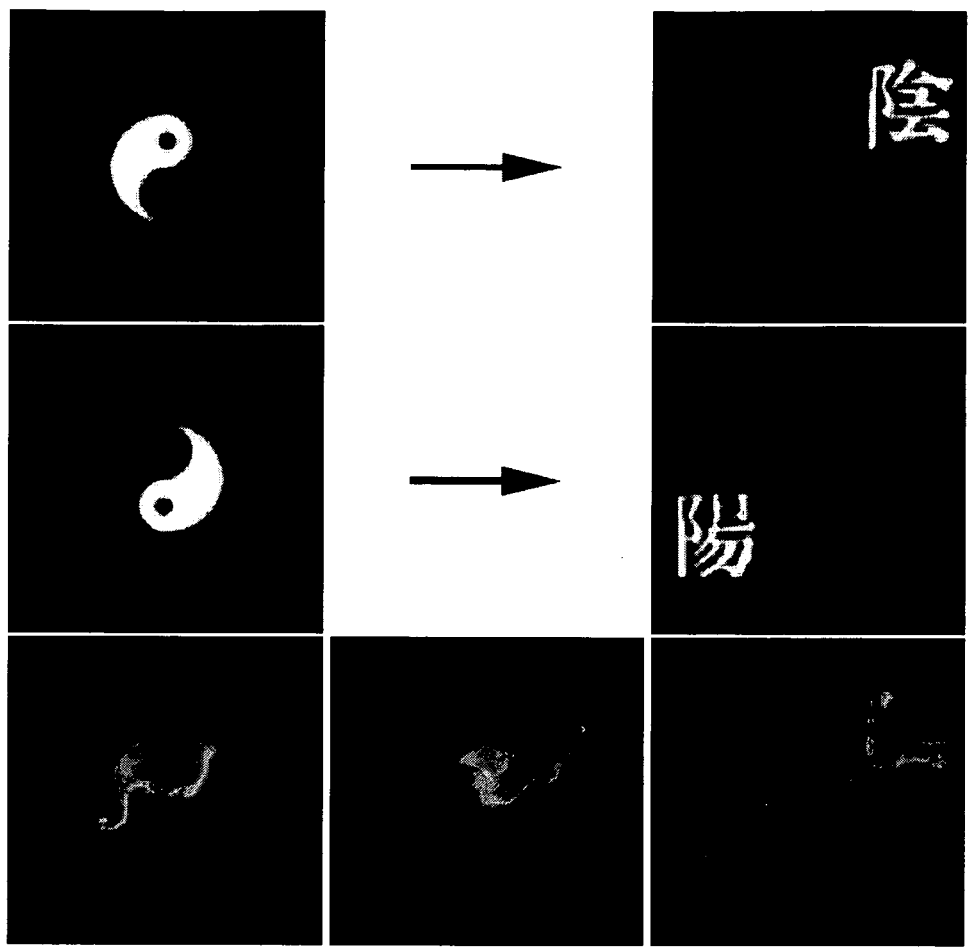
FIG. 7 shows pictorially use of the invention to control several smoke fields independently.

As discussed above, the invention allows animators to control several smoke fields independently. FIG. 7 demonstrates this for two smoke fields, each visualized using a different color. Here the use of two fields allows us to specify that the right half of the circle should flow towards the lower left corner, while the left half should flow to the upper right, which could not have been achieved with a single smoke field.

Figure 8:
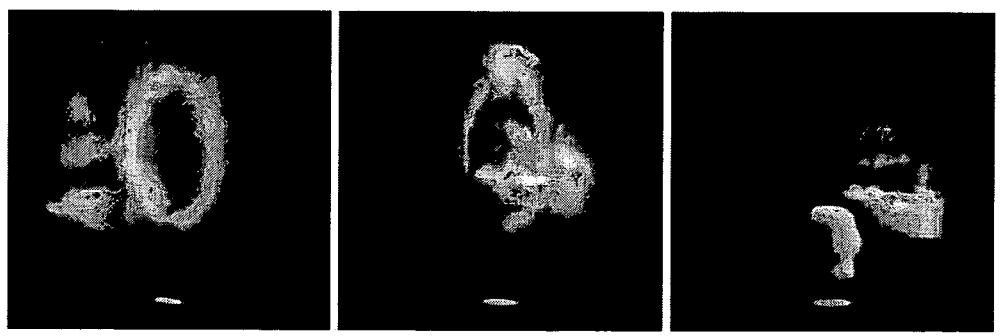
FIG. 8 shows pictorially a 3D animation having multiple interacting smoke fields.

Finally, FIG. 8 shows a 3D animation which utilizes a combination of all of the elements described above. In one smoke field a sphere evolves into a ring of smoke, while in another field the smoke tracks the shape of a galleon sailing through the smoke ring. Note that the two fields interact with each other via their shared medium fluid.

Limitations

Smoke diffusion is unavoidable in numerical simulations. As pointed out above, it presents a serious problem in the context of controlled smoke animations. The gathering term we have introduced does provide a partial remedy to this problem, as it enables the simulation to converge to an arbitrary target. However, the resulting smoke transition does not always come across as a natural evolution of smoke, since it is based on a diffusion process and not on kinetics. For example, the animation might sometimes look like the target is simply emerging from an amorphous static cloud of smoke. Thus, the gathering mechanism should be employed to the least extent necessary, leaving the task of forming the target, as much as possible, to the advection induced by the driving force.

As pointed out earlier, the target-driven paradigm does not guarantee optimal approximation of the targets, and the animator cannot directly control how well a particular target is approximated at a specific instant in time. However, the animator may control the simulation progress in a less direct manner via the $v_f$ parameter. Finally, just as in traditional keyframe animation, skill and experience are still required in order to choose the right target states and the appropriate control parameters to achieve a good animation.

Conclusion

The invention presents a new method and system for direct control of smoke animation by introducing new terms into the standard flow equations. Each of these terms has a simple closed form, and consequently they allow complex smoke animations to be controlled with little additional expense on top of the cost of an ordinary simulation.

Similarly to previous methods for simulation of smoke [3] the simulator according to the invention is easily extended to support the usual external forces (gravity, buoyancy, etc.) in addition to the driving force. It is also possible to add obstacles represented by internal boundary conditions.

It will be appreciated that the gathering term acts as a counter mechanism to the diffusion mechanism which is inherent to fluid flow. The invention contemplates other terms for driving a scalar object, such as smoke, through a sequence of target states, as well as other anti-diffusion mechanisms. A multi-resolution version of the gathering term may be employed to make gathering faster, more responsive, and more natural looking.

Although in the preferred embodiment, the target scalar fields define a desired temporal evolution of the scalar field, the invention also contemplates additional mechanisms for controlling smoke animations. For example, the animator may want to sketch out preferred paths for the smoke to flow along, without the need to generate many intermediate keyframes between the starting and the ending positions.

Hardware Implementation

Figure 9:
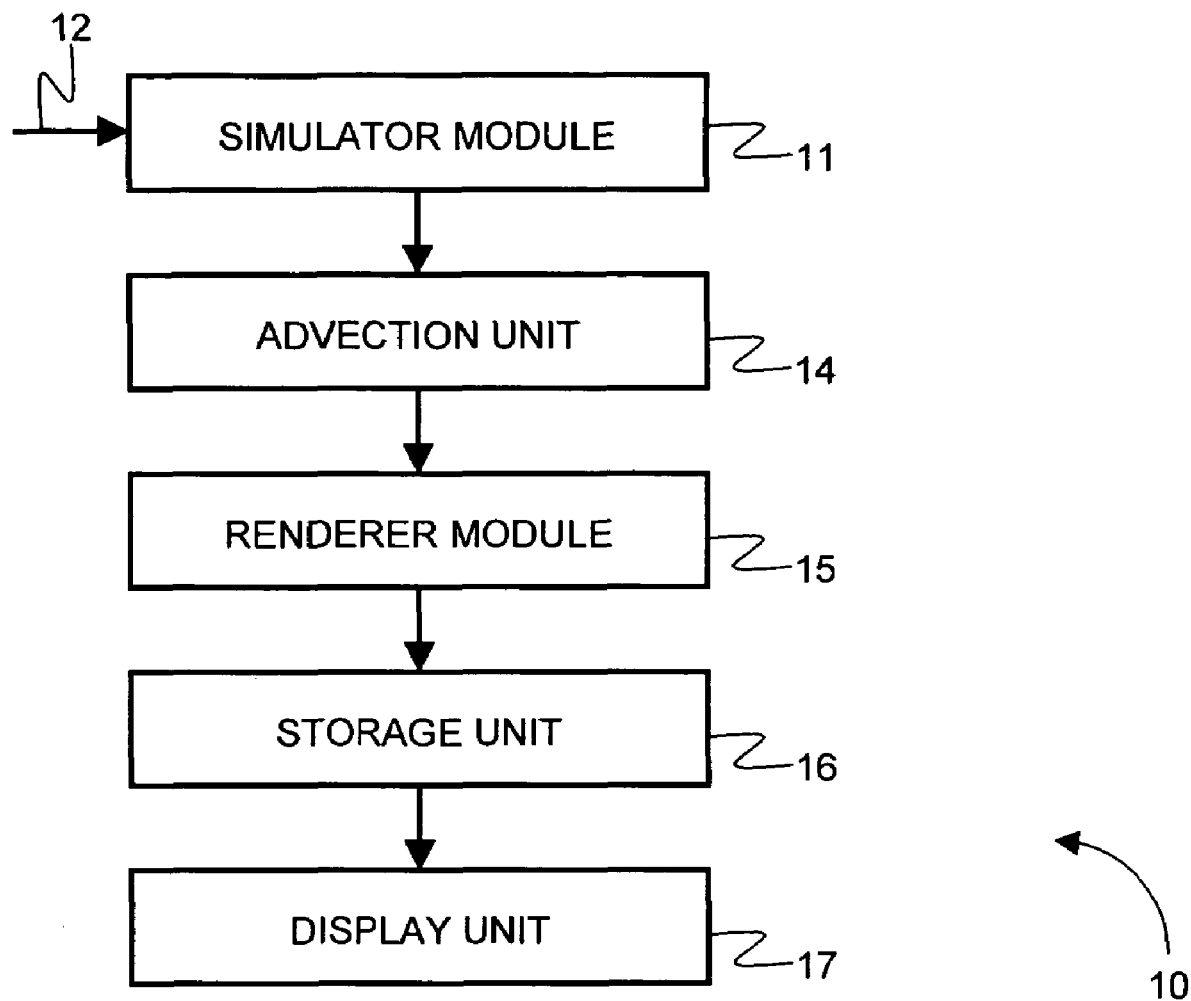
FIG. 9 is a block diagrams showing the functionality of a system according to the invention.

Referring now to FIG. 9, there is shown a block diagram of a system 10 according to the invention for performing computer graphic simulation of an incompressible fluid in motion. The system 10 comprises a simulator module 11 having an input 12 for receiving data that includes a scalar field that defines a physical property of the fluid or of matter suspended therein and a sequence of target scalar fields that define a desired temporal evolution of the scalar field. The simulator module 11 is adapted to calculate a velocity vector u of the fluid at a plurality of points in the simulated fluid, at a plurality of time intervals. To this end, the simulator module 11 may be a suitably programmed computer. As explained above, the calculation is performed by solving Equation 1 above. An advection unit 14 is coupled to the simulator module 11 and is responsive to the velocity values at each time interval to advect the scalar field. A renderer module 15 is coupled to the advection unit 14 and is responsive to some or all of the scalar fields for producing a sequence of animation frames each relating to a respective scalar field. A storage unit 16 is coupled to the renderer module 15 for storing the sequence of animation frames for subsequent display. A display unit 17 coupled to the storage unit 16 allows the sequence of animation frames to be displayed. The display unit 17 may be an integral component of the system 10 or alternatively it may be part of an external device that is coupled to the system 10. In the latter case, the system 10 serves to generate, render and store the appropriate animation frames. However, it will be appreciated that even when the display unit 17 is an integral component of the system 10, the animated frames are buffered prior to display and therefore the storage unit 16 may serve as the buffer in such case.

The system 10 may in practice be realized by a suitably programmed computer having a graphics card or workstation and suitable peripherals, all as are well known in the art. A detailed description of a suitable system is given in above-referenced U.S. Pat. No. 6,266,071 whose contents are incorporated herein by reference and to which reference should be made.

Figure 10:
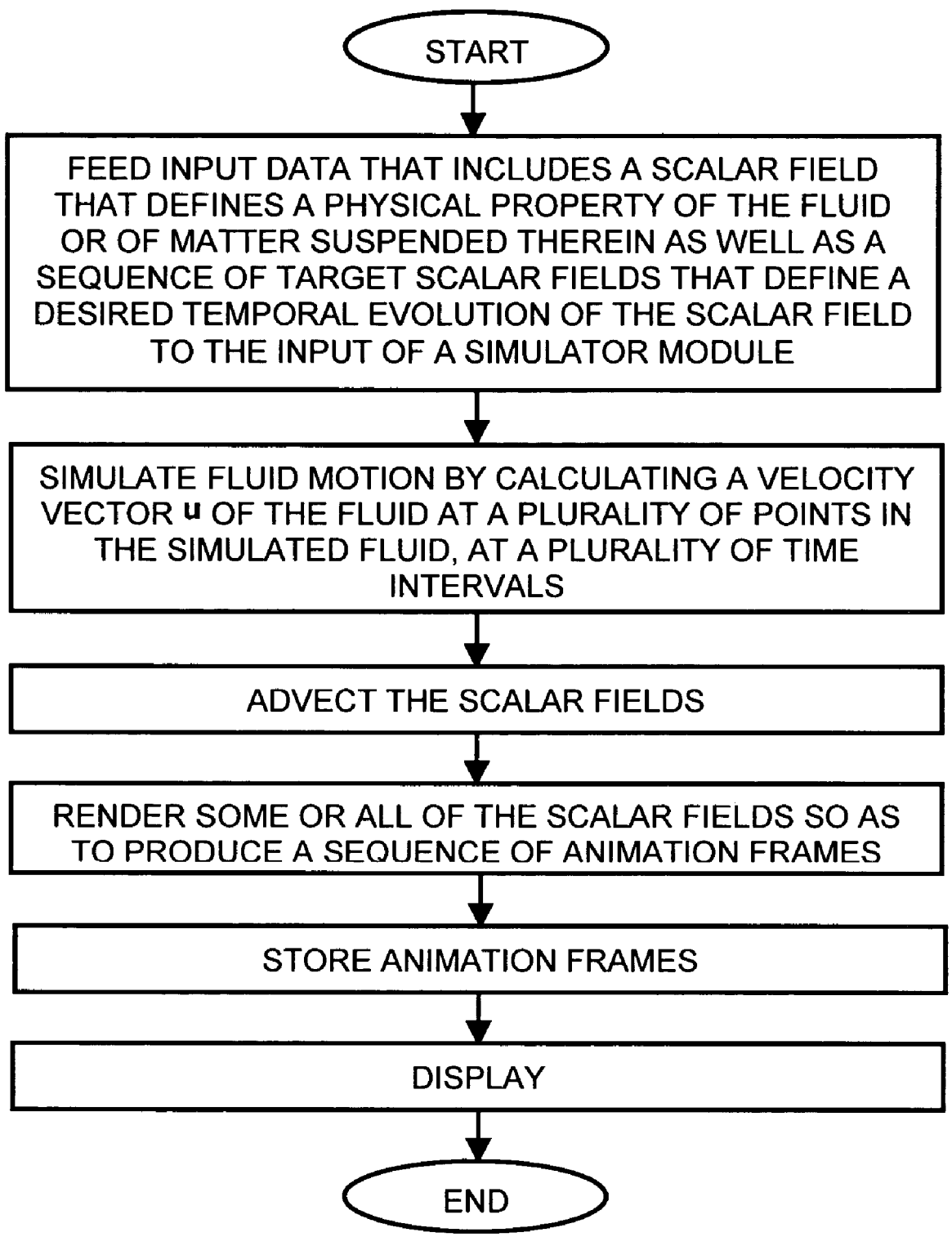
FIG. 10 is a flow diagram showing the principal operations carried out by the system shown in FIG. 9 according to the invention.

For the sake of completeness, FIG. 10 is a flow diagram showing the principal operations carried out by the system 10 according to the invention. Input data that includes a scalar field that defines a physical property of the fluid or of matter suspended therein as well as a sequence of target scalar fields that define a desired temporal evolution of the scalar field are fed to the input 12 of the simulator module 11. Fluid motion is then simulated. The simulator module 11 then calculates a velocity vector u of the fluid at a plurality of points in the simulated fluid, at a plurality of time intervals, in accordance with Equation 1.

The velocity values at each time interval are used by the advection unit 14 to advect the scalar fields and some or all of the scalar fields are sent to the renderer module 15 for producing a sequence of animation frames each relating to a respective scalar field, which is then stored in the storage unit 16 for subsequent display by the display unit 17.

As noted above, the system 10 and the simulator module 11 may be suitably programmed computers. Likewise, the invention contemplates a computer program being readable by a computer for executing the method of the invention. The invention further contemplates a machine-readable memory tangibly embodying a program of instructions executable by the machine for executing the method of the invention.

Likewise, the invention contemplates an animation sequence that is generated according to the method of the invention. The invention further contemplates a machine-readable memory tangibly embodying data representative of an animation sequence that is generated according to the method of the invention.

Appendix A: A High Resolution Hyperbolic Solver

The solution for hyperbolic conservation laws of the form $$q_t + (H(q))_x = 0$$

can be approximated numerically by using the Lax-Wendroff formula, corrected by a "flux limiter", described in detail in [9]. The idea is improve the accuracy of $1^{st}$ order upwinding by adding an anti-diffusive correction term. The correction term is modulated by aflux limiter in order to prevent oscillations.

More formally, the scheme uses the following update equation $$Q_i^{n+1} = Q_i^n - \frac{\Delta t}{\Delta x}\left(H_{i+\frac{1}{2}}(Q^n) - H_{i-\frac{1}{2}}(Q^n)\right).$$

Here $Q_i$ approximates the average density of the conserved quantity q in the cell $[(i-\frac{1}{2})\Delta x, (i+\frac{1}{2})\Delta x]$. The numerical flux function $H_{i+1/2}$ approximates the flux H(q) across the boundary between two neighboring cells (i,i+1). The numerical flux function defined by the Lax-Wendroff formula is given by $$H^{LW}(Q^n) = H^U(Q^n) + C(Q^n),$$

where $H^U$ is the 1st order upwinding flux function defined by $$H_{i+\frac{1}{2}}^U(Q^n) = \begin{cases} s_{i+\frac{1}{2}} Q_i^n & s_{i+\frac{1}{2}} > 0 \\ s_{i+\frac{1}{2}} Q_{i+1}^n & s_{i+\frac{1}{2}} < 0 \end{cases}$$

Here $s_{i+1/2}$ approximates the flux speed $\partial H/\partial q$ at $\Delta x(i+\frac{1}{2})$, and $C(Q^n)$ is an anti-diffusive correction term given, in its limited form, by $$C(Q^n) = \left(1 - \frac{\Delta t}{\Delta x}\left|s_{i+\frac{1}{2}}\right|\right) mml(Q^n)_{i+\frac{1}{2}}$$

where mml is a flux limiter (similar to the commonly used minmod limiter [9]) given by:

$$mml(Q^n)_{i+\frac{1}{2}} = \text{sgn} \cdot \min\{|Q_{i+2}^n - Q_{i+1}^n|, |Q_{i+1}^n - Q_i^n|, |Q_i^n - Q_{i-1}^n|\}$$

where:

$$\text{sgn} = \begin{cases} 1 & Q_{i+2}^n - Q_{i+1}^n, Q_{i+1}^n - Q_i^n, Q_i^n - Q_{i-1}^n > 0 \\ -1 & Q_{i+2}^n - Q_{i+1}^n, Q_{i+1}^n - Q_i^n, Q_i^n - Q_{i-1}^n < 0 \\ 0 & \text{otherwise} \end{cases}$$

As this scheme is based on the Lax-Wendroff formula, it is subject to a time step restriction: $\Delta t < \Delta x/s$, where s is the maximal flux speed.

We use this scheme to approximate the advection terms in the smoke and momentum equations, as well as the smoke gathering term. In the case of advection, the flux speed is simply the velocity along an axis. Therefore, when advecting a quantity along a particular axis, we need the proper velocity component, approximated on the faces perpendicular to that axis. In the case of smoke advection, the cells around the smoke variables coincide with the computational grid cells, so the flux speed is simply given by the velocity variables. When advecting the momentum components U,V,W, we obtain the flux speed on the boundaries between the cells around these variables by the proper averaging.

In the gathering case the flux speed should be evaluated on the faces of computational grid cells:

$$s_{i+\frac{1}{2}} = A(\tilde{\rho}^*)_{i+\frac{1}{2},j,k} D_x(\rho - \rho^*)_{i+\frac{1}{2},j,k}.$$

What is claimed is:

1. A computer-implemented method for performing computer graphic simulation of an incompressible fluid in motion, the method comprising:
   providing input data to a simulator module, the input data including a scalar field that defines a physical property of the fluid or of matter suspended therein and a sequence of target scalar fields that define a desired temporal evolution of the scalar field;
   simulating, in the simulator module, fluid motion by calculating a velocity vector u of the fluid at a plurality of points in the simulated fluid, at a plurality of time intervals, wherein said calculation is performed by solving an equation:

$$u_t = -u \cdot \nabla u - \nabla p + f^* + F$$

where:
   p=hydrostatic pressure,
   f*=combination of forces acting on the fluid;
   F=a computed driving force that is defined by a predetermined function having closed-form terms based on an instantaneous state of the simulation at each simulation time step and that propels the fluid in such a manner that the resulting flow carries the scalar field towards the next target scalar field in said sequence thus avoiding any need for non-linear optimization;
   $u_t$=is the vector of time derivatives of the velocity field u;
   using said velocity values at each time interval to advect the scalar field;
   sending the scalar field to a renderer module for producing a sequence of animation frames; and
   storing the sequence of animation frames for subsequent display.

2. The method according to claim 1, wherein the driving force F is a function $F(\rho, \rho^*)$ where:
   $\rho$=is a current scalar field, and
   $\rho^*$=is the next target scalar field in said sequence.

3. The method according to claim 2, wherein the driving force $F(\rho, \rho^*)$ satisfies the equation:

$$F(\rho, \rho^*) = \tilde{\rho} \frac{\nabla \tilde{\rho}^*}{\tilde{\rho}^*}$$

where:
   $\rho$=is a current scalar field,
   $\rho^*$=is the next target scalar field in said sequence,
   $\tilde{\rho}$=a blurred version of the scalar field.

4. The method according to claim 2, including inputting n (n>1) scalar fields $\rho^1, \ldots, \rho^n$ and n corresponding target scalar fields $\rho^{*,1}, \ldots, \rho^{*,n}$, the driving force F being the sum of the n driving forces $F(\rho^i, \rho^{*,i})$ and there being n advection equations for the scalar fields.

5. The method according to claim 1, wherein using said velocity values at each time interval to advect the scalar field includes applying a gathering term $G(\rho, \rho^*)$ that satisfies the equation:

$$\rho_t = -u \cdot \nabla \rho + v_g G(\rho, \rho^*)$$

where:
- $\rho$ = is the scalar field,
- $\rho_t$ = is the time derivative of the scalar field, and
- $v_g$ = a parameter that determines the rate at which $\rho$ is gathered towards $\rho^*$;

where $G(\rho, \rho^*)$ is a term that relates to gathering of matter suspended in the fluid, such that $\rho$ defines a density of said matter.

6. The method according to claim 5, including inputting n (n>1) scalar fields $\rho^1, \ldots, \rho^n$ and n corresponding target scalar fields $\rho^{*,1}, \ldots, \rho^{*,n}$, the driving force F being the sum of the n driving forces $F(\rho^i, \rho^{*,i})$ given by: $\rho_t^i = -u \cdot \nabla \rho^i + v_g G(\rho^1, \rho^2)$ where $G(\rho, \rho^*)$ is a term that relates to gathering of matter suspended in the fluid, such that $\rho^i$ defines a density of said matter.

7. The method according to claim 1, wherein the simulation is performed in two dimensions.

8. The method according to claim 1, wherein the simulation is performed in three dimensions.

9. The method according to claim 1, wherein the input data comprises one or more of the following:
(1) the definition of a grid, wherein said velocity is to be calculated at each cell of said grid and at each of said time intervals;
(2) the length of said time interval;
(3) the viscosity of the fluid; and
(4) the velocity values at the boundaries of said grid.

10. The method according to claim 1, wherein the scalar field is representative of temperature.

11. The method according to claim 1, wherein said scalar field is representative of density of matter suspended in the fluid.

12. The method according to claim 1, wherein said scalar field is representative of texture.

13. The method according to claim 1, wherein said scalar field is representative of smoke particles suspended in a fluid.

14. An animation sequence generated using the method according to claim 13, depicting smoke starting from one shape and evolving into entirely different shapes.

15. An animation sequence generated using the method according to claim 13, depicting smoke forming a desired shape.

16. An animation sequence generated using the method according to claim 13, depicting smoke following an animated character/shape.

17. An animation sequence generated using the method according to claim 13, depicting several smoke fields controlled separately, but evolving in the same fluid, so that they affect each other.

18. The method according to claim 1, wherein the combination of forces f* includes at least one in the group of: a viscous force, a buoyancy force and a gravity force of the fluid.

19. A system for performing computer graphic simulation of an incompressible fluid in motion, the system comprising:
a simulator module having an input for receiving data that includes a scalar field that defines a physical property of the fluid or of matter suspended therein and a sequence of target scalar fields that define a desired temporal evolution of the scalar field;
said simulator module being adapted to calculate a velocity vector u of the fluid at a plurality of points in the simulated fluid, at a plurality of time intervals, wherein said calculation is performed by solving an equation:

$$u_t = -u \cdot \nabla u - \nabla p + f^* + F$$

where:
- p = hydrostatic pressure,
- f* = combination of forces acting on the fluid;
- F = a computed driving force that is defined by a predetermined function having closed-form terms based on an instantaneous state of the simulation at each simulation time step and that propels the fluid in such a manner that the resulting flow carries the scalar field towards the next target scalar field in said sequence thus avoiding any need for non-linear optimization,
- $u_t$ = is the vector of time derivatives of the velocity field u;

an advection unit coupled to the computing unit for and being responsive to said velocity values at each time interval to advect the scalar field;
a renderer module coupled to the advection unit and being responsive to the scalar field for producing a sequence of animation frames; and
a storage unit coupled to the renderer module for storing the sequence of animation frames for subsequent display.

20. The system according to claim 19, further including a display unit coupled to the storage unit for displaying the sequence of animation frames.

21. The system according to claim 19, wherein the driving force F is a function $F(\rho, \rho^*)$ where:
- $\rho$ = is the current scalar field, and
- $\rho^*$ = is the next target scalar field in said sequence.

22. The system according to claim 21, wherein the driving force $F(\rho, \rho^*)$ satisfies the equation:

$$F(\rho, \rho^*) = \tilde{\rho} \frac{\nabla \tilde{\rho}^*}{\tilde{\rho}^*}$$

where:
- $\rho$ = is the current scalar field,
- $\rho^*$ = is the next target scalar field in said sequence,
- $\tilde{\rho}$ = a blurred version of the scalar field.

23. A program storage device readable by machine, tangibly embodying a program of instructions executable by the machine to perform method steps for performing computer graphic simulation of an incompressible fluid in motion, the method comprising:
providing to a simulator module input data that includes a scalar field that defines a physical property of the fluid or of matter suspended therein and a sequence of target scalar fields that define a desired temporal evolution of the scalar field;
simulating fluid motion by calculating a velocity vector u of the fluid at a plurality of points in the simulated fluid, at a plurality of time intervals, wherein said calculation is performed by solving an equation:

$$u_t = -u \cdot \nabla u - \nabla p + f^* + F$$

where:
- p = hydrostatic pressure,
- f* = combination of forces acting on the fluid;
- F = a computed driving force that is defined by a predetermined function having closed-form terms based on an instantaneous state of the simulation at each simulation time step and that propels the fluid in such a manner that the resulting flow carries the scalar field towards the next target scalar field in said sequence thus avoiding any need for non-linear optimization;

$u_t$=is the vector of time derivatives of the velocity field u;

using said velocity values at each time interval to advect the scalar field;

sending the scalar field to a renderer module for producing a sequence of animation frames; and;

storing the sequence of animation frames for subsequent display.

24. A computer storage medium having computer readable program code embodied therein for performing computer graphic simulation of an incompressible fluid in motion, the computer readable program code comprising:

computer readable program code for causing the computer to provide input data to a simulator module, the input data including a scalar field that defines a physical property of the fluid or of matter suspended therein and a sequence of target scalar fields that define a desired temporal evolution of the scalar field;

computer readable program code for causing the computer to simulate fluid motion by calculating a velocity vector u of the fluid at a plurality of points in the simulated fluid, at a plurality of time intervals, wherein said calculation is performed by solving an equation:

where: $u_t = -u \cdot \nabla u - \nabla p + f^* + F$ where:
p=hydrostatic pressure,
f*=combination of forces acting on the fluid;

F=a computed driving force that is defined by a predetermined function having closed-form terms based on an instantaneous state of the simulation at each simulation time step and that propels the fluid in such a manner that the resulting flow carries the scalar field towards the next target scalar field in said sequence thus avoiding any need for non-linear optimization;

$u_t$=is the vector of time derivatives of the velocity field u;

computer readable program code for causing the computer to use said velocity values at each time interval to advect the scalar field;

computer readable program code for causing the computer to render the scalar field so as to produce a sequence of animation frames; and computer readable program code for causing the computer to store the sequence of animation frames for subsequent display.

25. The method according to claim 1, wherein the velocity vector u is calculated by solving an equation:

$$u_t = -u \cdot \nabla u - \nabla p + f^* + v_f F(\rho, \rho^*) - v_d u$$

where:
$-v_d u$ is a momentum attenuation term.

26. The system according to claim 19, wherein the simulator module is adapted to calculate the velocity vector u by solving an equation:

$$u_t = -u \cdot \nabla u - \nabla p + f^* + v_f F(\rho, \rho^*) - v_d u$$

where:
$-v_d$ is a momentum attenuation term.

* * * * *